United States Patent [19]

Lauricella

[11] 3,708,178
[45] Jan. 2, 1973

[54] PROGRESSIVE-TIGHTENING SPINDLE CHUCK FOR MILLING MACHINES OR OTHER MACHINE TOOLS

[76] Inventor: Robert Lauricella, 16 Rue de la Vivaraise, Saint-Etienne, France

[22] Filed: July 24, 1970

[21] Appl. No.: 57,974

[52] U.S. Cl. ................................... 279/81, 279/1 E
[51] Int. Cl. ..................... B23b 31/10, B23b 31/22
[58] Field of Search ....... 279/81, 1 B, 1 E, 22, 75, 30, 279/77, 82, 103; 90/11 A

[56] References Cited

UNITED STATES PATENTS

| | | | |
|---|---|---|---|
| 3,405,950 | 10/1968 | Cox | 279/103 |
| 666,511 | 1/1901 | Furbish | 279/81 |
| 1,309,815 | 7/1919 | Schinkez | 279/81 X |
| 2,511,416 | 6/1950 | Rundorff | 279/1 E |
| 2,731,273 | 1/1956 | Edens | 279/81 |

FOREIGN PATENTS OR APPLICATIONS 15,717    7/1912    Great Britain .................. 279/81

Primary Examiner—Gil Weidenfeld
Attorney—Waters, Roditi, Schwartz & Nissen

[57] ABSTRACT

A tool-holding chuck having a tapered body in which a generally tapered socket-receiving chamber is formed, the socket and chamber having a pair of spaced tapered cooperative bearing surfaces, and a rotatable control ring encompassing the tapered body and being rotatably and axially manipulatable relative thereto for effecting quick-release and change of the socket positioned in the chuck body chamber.

7 Claims, 8 Drawing Figures

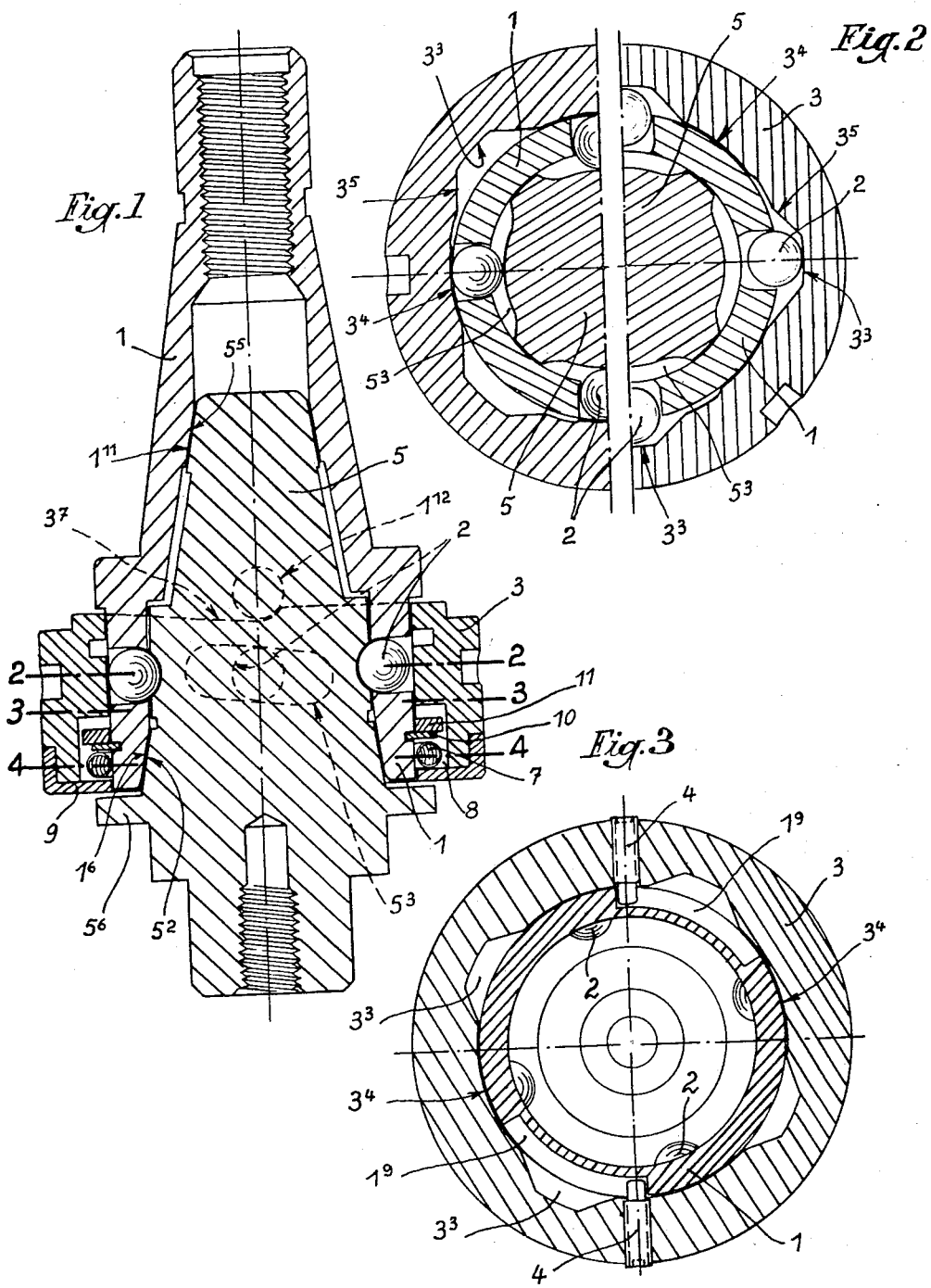

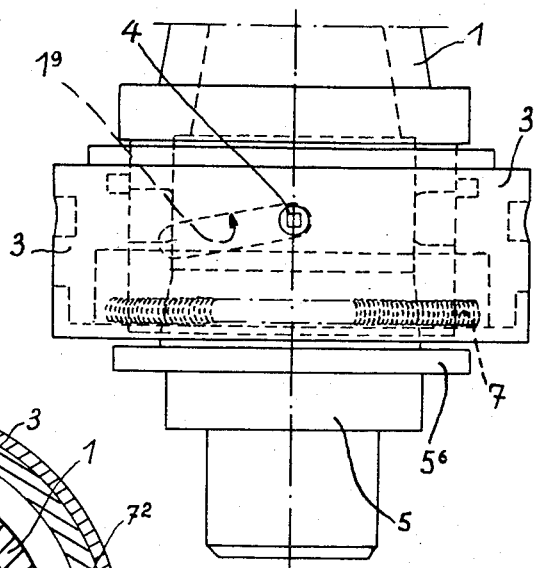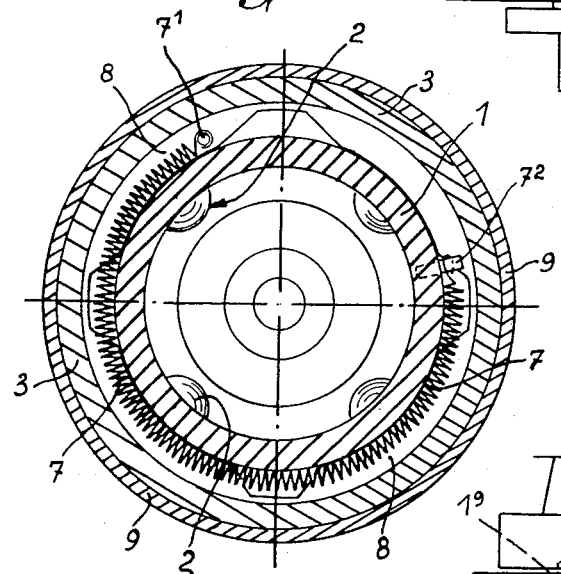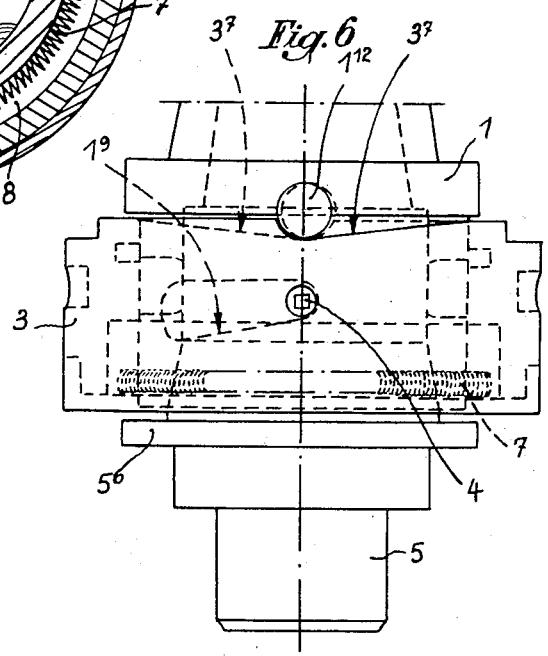

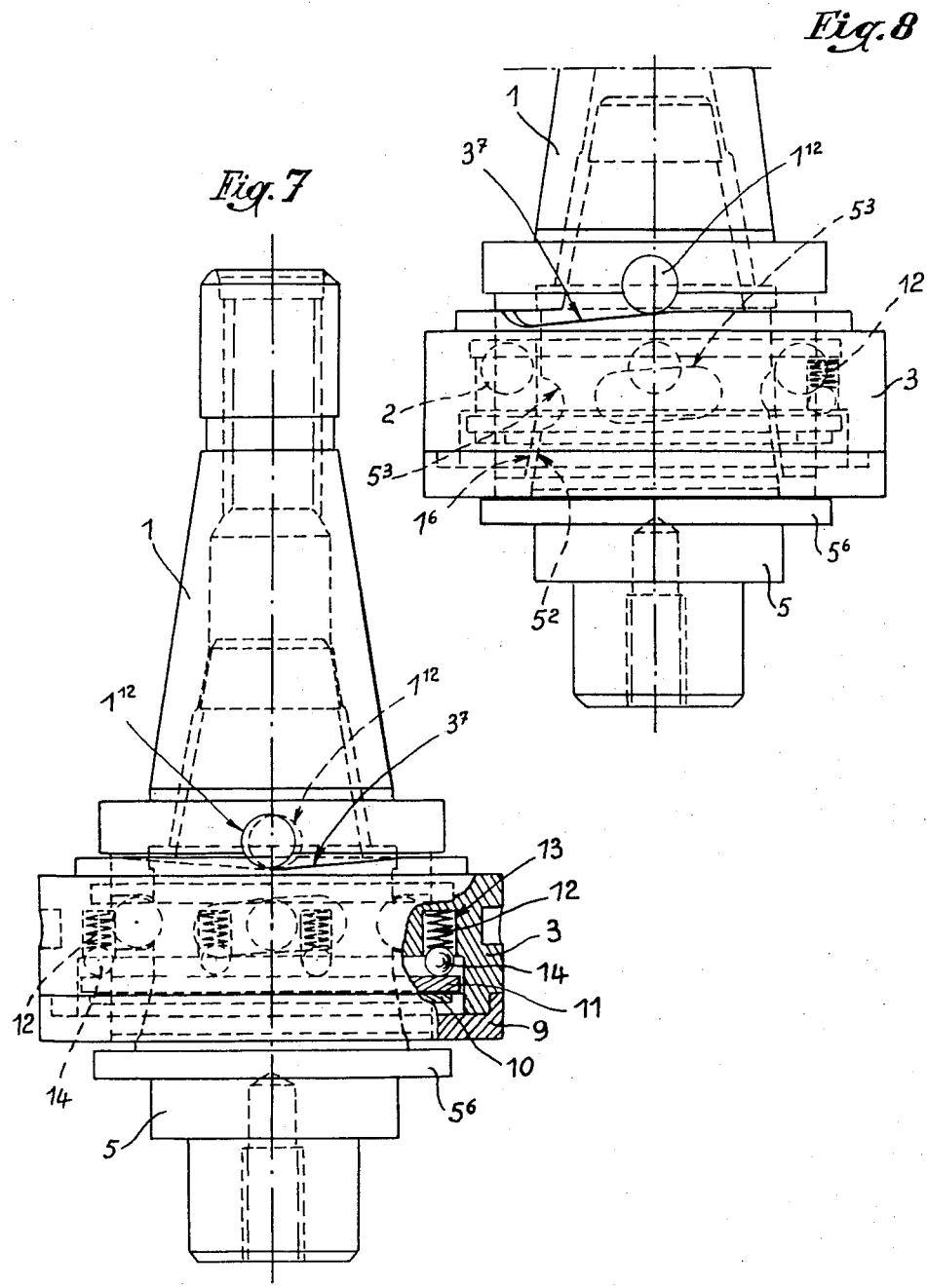

PROGRESSIVE-TIGHTENING SPINDLE CHUCK FOR MILLING MACHINES OR OTHER MACHINE TOOLS

In a former French Pat. No. 1.579.425 there is described and illustrated a progressive-tightening spindle chuck or mandrel of which the body, adapted to fit with its standard taper shank in the driving spindle of a milling head or other machine tool, comprises an internal chamber in which a detachable tool-holding socket is adapted to be engaged and centered, balls housed in transverse holes of said body for co-operating, with their projecting spherical portions, with helical grooves or cam faces provided in the outer periphery of said socket, in combination with a control ring adapted in one position to lock and therefore drive said socket with a progressive tightening action obtained by holding said balls in their grooves, or alternatively, in another position, to cause said balls to recede inwards and thus permit the removal or fitting of said socket in position.

In this former French Patent the socket is so designed that it bears in said body through the engagement of a single tapered abutment located at or near the opening of said chamber, and the control ring is designed for axial sliding movement on said body for providing the above mentioned functions.

The present invention is concerned with improvements in spindle chucks or mandrels of the general type set forth hereinabove.

According to a first object of this invention, the socket is held and strictly centered in said body by means of two bearing surfaces disposed on the generatrix of a same cone and having a maximum axial spacing from each other, one bearing surface being adjacent to the opening, and the other bearing surface is adjacent to the bottom, of the chamber formed in said body.

According to another object of this invention, the control ring is rotatable mounted and has formed on its inner peripheral surface alternate recesses and bosses adapted to release or lock said balls according to the relative angular position of said ring and body.

On the other hand, said control ring is advantageously adapted, during its rotation in the direction to release the socket, to perform a concomitant slight axial movement causing said ring to abute against said socket so as to positively eject same in case its tapered bearing surfaces were jammed or stuck in relation to those of said body.

This slight axial movement of the control ring, which is concomitant with its rotational movement, is advantageously produced by providing cam faces on its upper or inner face, with co-act with fixed studs carried by said body.

This slight axial movement may also be obtained through a suitable inclination of the inner or upper semi-circular face or faces of the slot or slots provided for guiding and limiting the amplitude of the partial rotational movement of said control ring and engaged by guide studs rigid with said ring.

Since the rotational movement of said control ring for releasing the sleeve or permitting the insertion thereof into said body is obtained manually, some means must be provided for automatically returning said ring to its locking position.

This return action is advantageously obtained by using a coil tension spring surrounding said body and having one end anchored to said body and the other to said ring.

In case a slight axial movement of said ring concomitant with the partial rotation thereof were desired, other means must also be provided for automatically returning the ring to its inner position. To this end, advantage may be taken of the presence of the outer inclined face or faces of the semi-circular guide slot or slots limiting the amplitude of the partial rotation of said ring.

As an alternative, the control ring may be returned to its locking position, both in rotation and in axial translation, by using a plurality of relatively small coil compression springs disposed at spaced intervals along the periphery of said ring and adapted to be compressed during the release movement thereof, the expansion of said spring, by reaction against the cam faces having caused the outward movement of said control ring, causing the desired double return movement.

A clearer understanding of the improvements broadly set forth in the foregoing will be had from the following description of typical forms of embodiment of the invention given by way of example with reference to the attached drawing, in which:

FIG. 1 is a general axial sectional view of the device;

FIG. 2 is a cross section taken along the line 2—2 of FIG. 1, showing two different positions of the control ring;

FIGS. 3 and 4 are further cross sections taken along the lines 3—3 and 4—4 of FIG. 1 respectively, from which the socket has been omitted in order to simplify the drawing;

FIGS. 5 and 6 are fragmentary side-elevational views showing two modified forms of embodiment of the means for causing the axial movement of the ring, and FIGS. 7 and 8 are similar views showing a different form of embodiment of the invention, in the socket locking position and in the socket releasing position by ejection thrust respectively.

As shown more particularly in FIG. 1, the inner cavity or chamber of the chuck-body 1 comprises two tapered bearing surfaces $1^6$ and $1^{11}$ respectively, positioned on a common generatrix of a cone. The sleeve 5 associated with said body comprises two corresponding tapered bearing surfaces $5^2$, $5^5$ having the same spacing and dimensions and therefore adapted to co-act with the bearing surfaces of said body.

As a result of this arrangement, the socket is strictly centered and perfectly held in the body.

On the other hand, the control ring 3 is mounted on the body 1 so as to be adapted to perform a partial rotary movement thereon. To this end, one or more stud-screws 4 are provided in the ring 3 for limiting and guiding the movement of this ring by engaging each a slot $1^9$ of semicircular contour formed in said body (FIG. 3). Moreover, the bore of this ring 3 is formed with alternate recesses $3^3$ and bosses $3^4$ interconnected by cam faces $3^5$.

In the inoperative position the bosses $3^4$ register with balls 2 (see left-hand portion of FIG. 2) so as to normally hold these balls inwards and keep their projecting spherical portions locked in the helical grooves $5^3$ of socket 5.

To release the socket it is only necessary, by manually rotating the ring 3, to bring the recesses $3^3$ thereof in radial alignment with the balls 2 to permit the radial outward movement of these balls from the grooves $5^3$ so as to either free the socket 5 or permit the insertion thereof (right-hand portion of FIG. 2).

From its released position the ring 3 must be returned automatically to the position in which it locks the socket 5. To this end and as shown in FIGS. 1, 4, 5 and 6, a coil tension spring 7 is enclosed in an annular chamber 8 formed in ring 3, between an annular cup 9 fitted to this ring 3 and a circlip 10 fitted in a groove of said body 1 for retaining a washer 11. This spring 7 has one end anchored at $7^1$ to ring 3 and the opposite end anchored at $7^2$ to said body 1 (FIG. 4).

On the other hand, after a certain time of operation it may happen that the socket 5 does not releases itself automatically from the body 1, for example by gravity, when the release movement is effected by partially rotating the control ring 3 due to the jamming or "-sticking" of the bearing surfaces $1^6$, $5^2$ and $1^{11}$, $5^5$ to one another. To avoid this inconvenience, the movement of partial rotation imparted to the ring 3 may be attended by a slight axial translation thereof which causes this ring to move outwards and abute with its annular cup 9 against a circular flange $5^6$ of socket 5, so that said ring acts somewhat like an ejector.

The downward movement of ring 3 (as seen in FIG. 1), concomitant with its partial rotation is advantageously obtained by means of cam faces $3^7$ formed on the inner or upper edge of said ring 3 and engaged by studs or fingers $1^{12}$ secured to said body 1.

However, this axial movement of ring 3 may also be obtained by using a helical inclined contour of the upper or inner face or faces of the slot or slots $1^9$ formed in the body 1 for limiting the ring rotation (see FIG. 5).

On the other hand, when the control ring 3 is released after having been rotated, so as to resume by itself its inoperative position, it is desirable that this ring resumes likewise by itself its initial axial position. This may be obtained by utilizing to this end the lower or outer face of the slot or slots $1^9$ to which an inclined helical configuration may be given (see FIGS. 5 and 6).

According to a modified form of embodiment illustrated in FIGS. 7 and 8, the ring 3 may be returned both in rotation and in axial translation by means of coil compression springs 12 housed in cavities 13 of said ring and disposed at spaced intervals along the periphery thereof, parallel to the ring axis. These springs 12 are adapted to exert a resilient force through balls 14 against the washer 11 of body 1. Thus, when the ring 3 is manually rotated to release or insert the socket 5, said springs are compressed so as to return the ring inwards when the operator releases same.

The same springs 12 may also be used for simultaneously urging the ring 3 to their initial angular position by causing the cam faces $3^7$ to react against the studs or fingers $1^{12}$.

Although a few different forms of embodiment have been described and illustrated herein, it will readily occur to those conversant with the art that various modifications may be brought thereto without departing from the spirit and scope of the invention, as set forth in the appended claims.

What I claimed as new is:

1. Tool-holding chuck of the progressive-tightening type, particularly for milling machines or other machine tools, comprising; a body having a substantially tapered configuration, a chamber formed in said body and having tapered surface portions; a detachable socket comprising an essentially tapered shank engageable within said chamber and being centered relative thereto, said chamber tapered surface portions and said shank each including a pair of spaced cooperative tapered bearing surfaces lying on the generatrix of a common cone adjacent respectively the opening and bottom ends of said chamber in said body; means for locking said socket in said body, said locking means comprising a plurality of balls each housed in holes formed to extend transversely through the walls of said body and having diameters larger than the thickness of said body so project interiorly and exteriorly thereof; helical grooves formed in said socket for coacting with the radially inner surfaces of said balls; a control ring surrounding said body and said balls and being peripherally rotatable relative to said body, hollow relief portions being formed in the inner peripheral surface of said ring adapted to receive at least the radially outer portions of said balls, said body having external arcuately extending notches; and at least one stud means mounted on said ring extending into said notches for limiting rotation of said control ring about said body.

2. A chuck as claimed in claim 1, said control ring having cam faces formed on one end surface thereof, and further stud means being mounted on said body; said cam faces adapted to be contacted by said further stud means, whereby in response to rotation of said ring about said body said stud means impart concomitant translational axial movement to said ring, and said ring engages a flange on said socket so as to eject the latter from said body upon slight mutual jamming between said cooperative tapered bearing surfaces.

3. A chuck as claimed in claim 1, said arcuate notches in said control ring have inclined surface portions, said inclined surface portions adapted to be contacted the ends of said stud means, whereby in response to rotation of said ring about said body said stud means impart concomitant translational axial movement to said ring, and said ring engages a flange on said socket so as to eject the latter from said body upon slight mutual jamming between said cooperative tapered bearing surfaces.

4. A chuck as claimed in claim 1, comprising means for automatically returning said control ring to an initial position relative to said body subsequent to manual rotation of said ring.

5. A chuck as claimed in claim 4, said ring returning means comprising a coil tension spring, one end said spring being fastened to said control ring and the other end of being fastened to said body.

6. A chuck as claimed in claim 1, wherein said arcuate notches in said control ring have radially outer surface portions formed in a helical contour adapted to be contacted by said stud means, whereby in response to rotation of said ring about said body said stud means impart concomitant translational axial movement to said ring, and said ring engages a flange on said socket so as to eject the latter from said body upon slight mutual jamming between said cooperative tapered bearing surfaces.

7. A chuck as claimed in claim 1, further stud means being mounted on said body, said control ring comprising a plurality of cam faces adapted to be engaged by said further stud means, said stud means in response to rotation of said ring about to said body imparting concommitent translational axial movement to said ring, said ring engaging a flange on said socket so as to eject the latter from said body upon slight mutual jamming between said cooperative tapered bearing surfaces; a plurality of coil compression springs being spaced at intervals along the periphery of said ring, said springs being compressed in response to rotation of said ring from its initial position, and adapted to impart expansive reactive forces against said cam faces so as to effect return rotational and axially translational movement of said ring relative to said body.

* * * * *